(12) United States Patent
Jewell

(10) Patent No.: US 11,156,278 B2
(45) Date of Patent: Oct. 26, 2021

(54) CROSS FLOW TURBINE HUB

(71) Applicant: SCHAEFFLER TECHNOLOGIES AG & CO. KG, Herzogenaurach (DE)

(72) Inventor: Jeremy Jewell, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 39 days.

(21) Appl. No.: 16/570,234

(22) Filed: Sep. 13, 2019

(65) Prior Publication Data

US 2021/0079989 A1    Mar. 18, 2021

(51) Int. Cl.
*F16H 45/02*    (2006.01)

(52) U.S. Cl.
CPC ....... *F16H 45/02* (2013.01); *F16H 2045/021* (2013.01); *F16H 2045/0205* (2013.01); *F16H 2045/0215* (2013.01)

(58) Field of Classification Search
CPC ....... F16H 2045/0205; F16H 2045/021; F16H 2045/0215
See application file for complete search history.

(56) References Cited

U.S. PATENT DOCUMENTS

| | | | | |
|---|---|---|---|---|
| 5,441,135 A * | 8/1995 | Worner | ................... | F16H 45/02 192/3.25 |
| 2005/0133328 A1* | 6/2005 | Masuya | ................... | B60K 6/48 192/3.3 |
| 2007/0235277 A1* | 10/2007 | Heuler | ................ | F16D 25/0638 192/3.3 |
| 2011/0120829 A1 | 5/2011 | Vanni et al. | | |
| 2012/0118694 A1* | 5/2012 | Riess | ...................... | F16H 61/50 192/3.29 |
| 2013/0056319 A1* | 3/2013 | Lindemann | ......... | F16D 25/0638 192/3.29 |
| 2013/0224002 A1 | 8/2013 | Ito et al. | | |
| 2014/0076680 A1* | 3/2014 | Matsuoka | ............... | F16D 47/06 192/3.29 |
| 2015/0008086 A1* | 1/2015 | Mototsune | .............. | F16D 33/18 192/3.29 |
| 2015/0300473 A1 | 10/2015 | Smith | | |
| 2015/0362052 A1* | 12/2015 | Frait | ................... | F16H 61/0021 60/341 |
| 2017/0114890 A1* | 4/2017 | Hwang | ................... | F16H 41/24 |

* cited by examiner

*Primary Examiner* — Timothy Hannon
(74) *Attorney, Agent, or Firm* — Dickinson Wright PLLC

(57) ABSTRACT

A torque converter is provided with a turbine hub with a pair of flow channels formed therein. In embodiments, the torque converter has a clutch piston configured to engage or disengage a disconnect clutch. On one side of the clutch piston is an apply chamber configured to receive fluid, wherein the fluid when subjected to pressure moves the clutch piston to engage the clutch. On the other side of the clutch piston can be a second fluid chamber, such as a circulation chamber or a release chamber. The turbine hub has a pair of flow channels formed therein, one that supplies fluid directly to the apply chamber, and one that supplies fluid directly to the second fluid chamber.

11 Claims, 4 Drawing Sheets

CROSS FLOW TURBINE HUB

TECHNICAL FIELD

The present disclosure relates generally to a torque converter, and more specifically to fluid passages within a turbine hub of the torque converter.

BACKGROUND

Automotive vehicles with automatic transmissions are known to be equipped with a torque converter. The torque converter is a fluid coupling which can transfer rotating power from an engine to an automatic transmission. Torque converters are typically equipped with a lock-up clutch. Allowing slip in the torque converter clutch is an effective method to reduce drivetrain vibration; however, efficiency is lost in the form of heat as a function of increased slip speed.

Three-pass torque converters are known in which two passages are used for circulation of automatic transmission fluid through the torus (e.g., formed by the impeller and turbine). For example, a three-pass torque converter may be provided with three fluid passages: an inlet passage for supplying fluid to the torus, an outlet passage for the release of fluid from the torus, and a designated supply port to supply fluid pressure to a piston of the clutch. Four-pass torque converters are also known to have a fourth fluid passage. The fourth fluid passage may be for supplying fluid to a pressure compensation chamber. The pressure compensation chamber shields the pressure chambers of the clutch from charge pressure fluctuations.

SUMMARY

In one embodiment, a four-pass torque converter includes a cover configured to rate about an axis, a turbine hub configured to rotate about the axis, and a clutch plate configured to slide axially relative to the turbine hub to selectively open and close a disconnect clutch. A compensation chamber is at least partially bound by one side of the clutch plate. An apply chamber is at least partially bound by an opposite side of the clutch plate relative to the compensation chamber, wherein an application of pressurized fluid in the apply chamber moves the clutch plate in an axial direction to close the disconnect clutch. The turbine hub includes a first fluid channel formed therein and configured to supply fluid to the compensation chamber, and a second fluid channel formed therein and configured to supply fluid to the apply chamber.

In one embodiment, a three-pass torque converter includes a cover configured to rotate about a central axis, a turbine hub configured to rotate about the central axis, a clutch plate configured to slide axially relative to the turbine hub to selectively open and close a disconnect clutch, a pressure chamber at least partially bound by one side of the clutch plate, and an apply chamber at least partially bound by an opposite side of the clutch plate relative to the pressure chamber. An application of pressurized fluid in the apply chamber moves the clutch plate in an axial direction to close the disconnect clutch. The turbine hub includes a first fluid channel formed therein and configured to supply fluid to the pressure chamber, and a second fluid channel formed therein and configured to supply fluid to the apply chamber.

In one embodiment, a torque converter includes a cover, a turbine, a turbine hub non-rotatably coupled or integrally formed with the turbine, a clutch plate configured to slide axially along to the turbine hub to selectively open and close a disconnect clutch, a first pressure chamber at least partially bound by a first side of the clutch plate, and a second pressure chamber at least partially bound by a second side of the clutch plate. The turbine hub includes a first fluid channel extending, axially therethrough configured to supply fluid to the first pressure chamber, and a second fluid channel extending radially therethrough and configured to supply fluid to the second pressure chamber.

DETAILED DESCRIPTION

Figure 1:
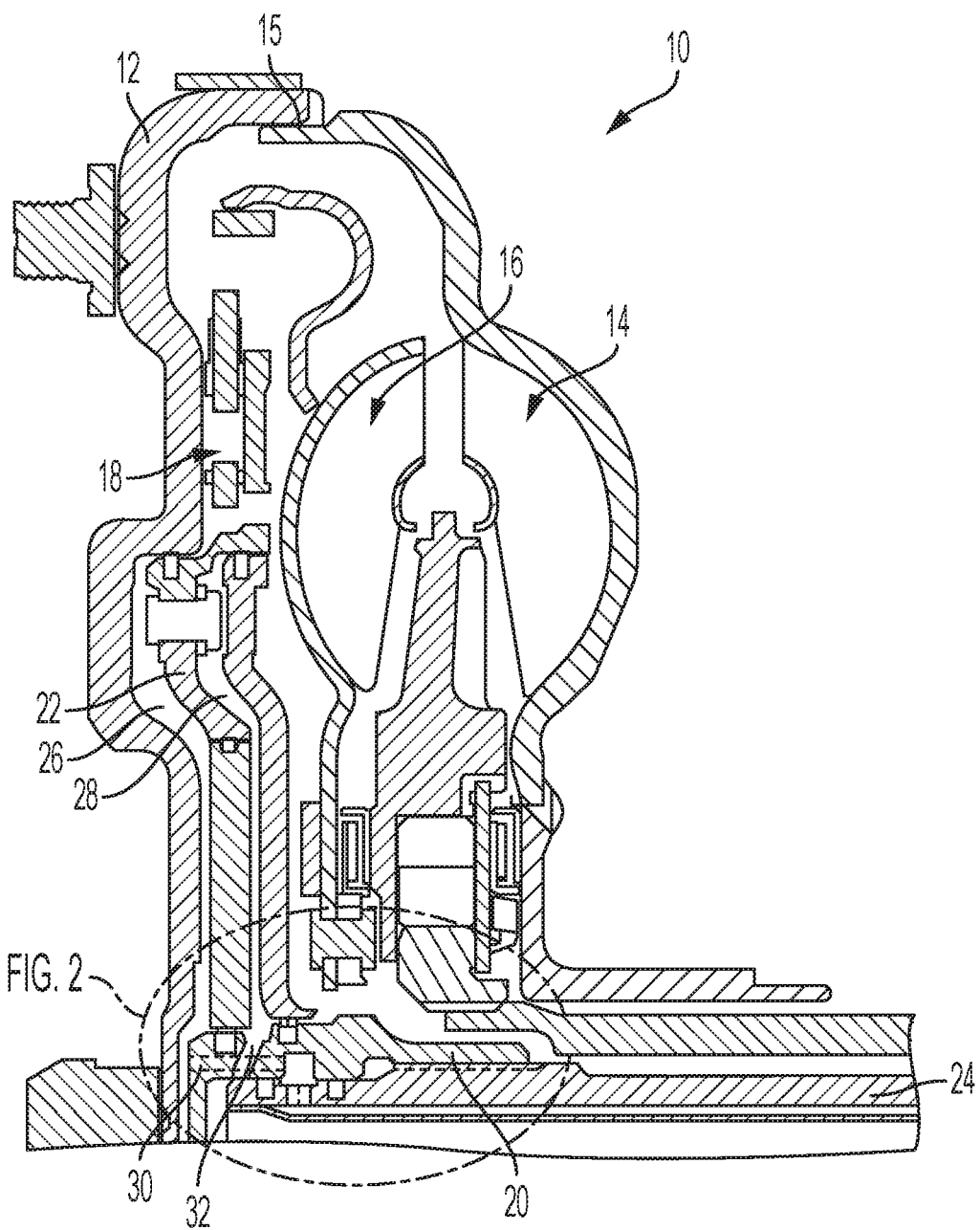
FIG. 1 is a cross-sectional view of a four-pass torque converter having crossing fluid channels in a turbine hub, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

A three-pass torque converter may be provided with three fluid passages; an inlet passage for supplying fluid to the torus, an outlet passage for the release of fluid from the torus, and a designated apply port to supply fluid pressure to a piston of the clutch. A four-pass torque converter may be provided with an additional, fourth fluid passage for supplying fluid to a pressure compensation chamber to allow more precise operation of the torque converter during times of fluctuating pressures in the torque converter.

In both three-pass and four-pass torque converters, such as those which apply the torque converter clutch against the cover of the torque converter, two transmission flow passages may be required to cross paths. Pressure differences of the two crossing flow paths should remain isolated but crossed-over to allow the correct fluid circuit to supply pressure to the respective destination (e.g., apply chamber, compensation chamber, etc.). Cross-flow designs typically utilize a machined hub with flow holes drilled therein in a pattern radially around the centerline of the hub. The direction of the flow holes alternates to create a flow path for each of the two flow passages, which direct the transmission fluid to their respective destinations. Some components can be costly to manufacture, typically requiring the cover and an additional sealing plate to be welded to the hub. These welds can also require expensive laser welds.

According to various embodiments explained herein, the two crossing flow paths are incorporated into the turbine hub. This can eliminate the need for a complex design of a cover hub, and replaced with simplified components that can be manufactured more easily (e.g., stamped). This also allows for the number of laser weldings to be reduced.

Figure 2:
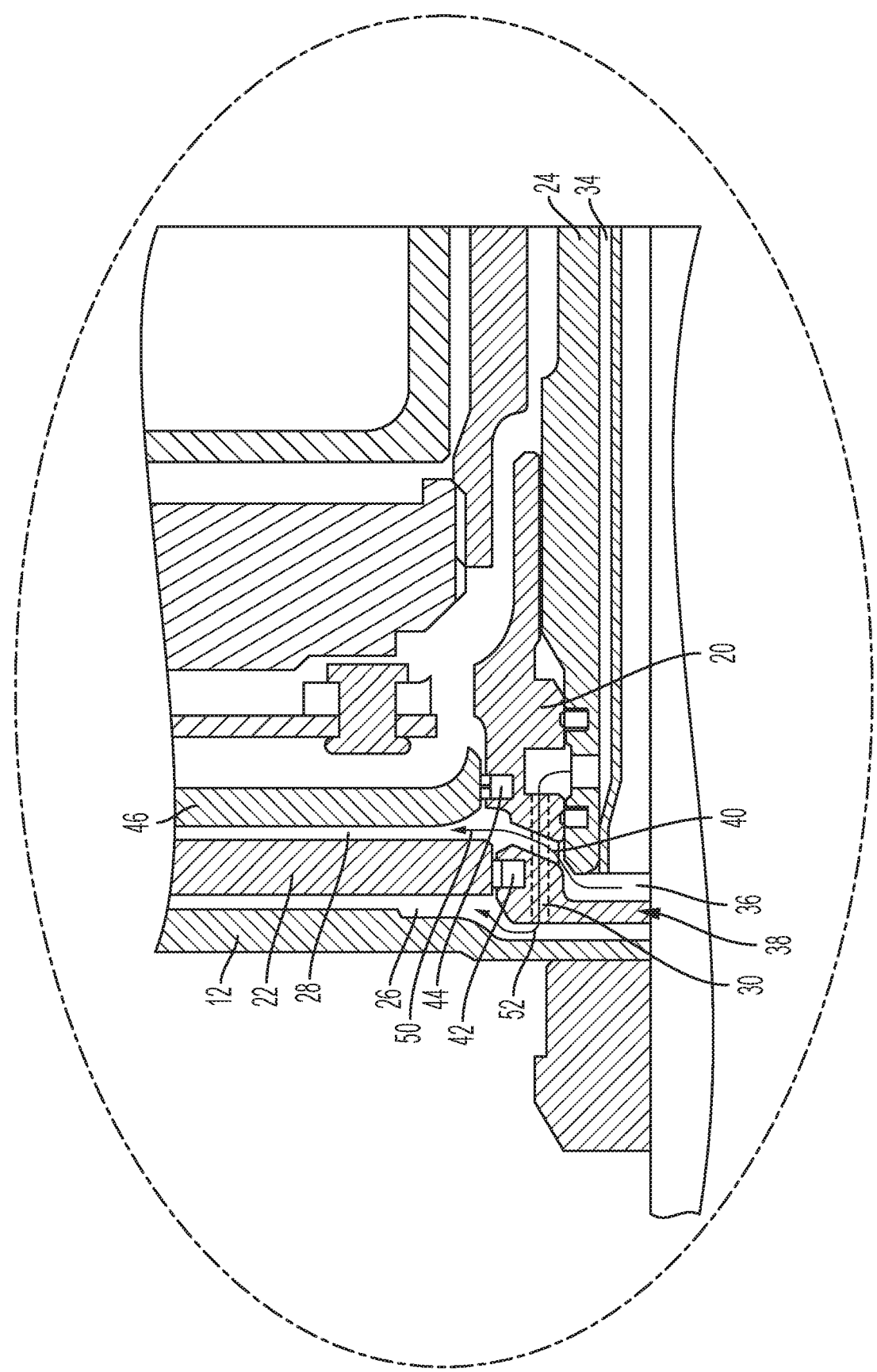
FIG. 2 is an enlarged view of a region of FIG. 1.

FIG. 1 illustrates a torque converter 10 according to one embodiment, and FIG. 2 illustrates an enlarged view of a region of FIG. 1. The torque converter 10 is a four-pass torque converter, as will be described further below. Various parts of the torque converter 10 rotate about a central axis. The torque converter 10 includes a cover 12 configured to receive torque from a crankshaft of an internal combustion engine. The torque converter 10 may also include an impeller 14, also referred to as a pump. The cover 12 and an outer shell of the impeller 14 may be fastened together via a weld 15, for example. The torque converter may also include a turbine 16, a lockup clutch 18, and a turbine hub 20. The turbine hub 20 may be non-rotatably coupled to (or integrally, part of) the turbine 16. The lockup clutch 18 includes an axially-displaceable piston plate 22 (also referred to as a piston) configured to directly connect the cover 12 to the turbine hub 20. The turbine hub 20 can be non-rotatably connected (e.g., via a spline connection) to an input shaft 24 for a transmission to transfer torque from the torque converter 10 to the transmission. As such, the turbine hub 20 can also be referred to as an output hub.

The torque converter 10 includes several chambers for receiving fluid (e.g., automatic transmission fluid, ATF), including a compensation chamber 26 (also referred to as a circulation chamber, cancellation chamber, or first pressure chamber) and an apply chamber 28 (also referred to as a piston apply chamber or second pressure chamber), each of which are partially bound by the piston 22. In operation, fluid pressure in the apply chamber 28 is configured to displace the piston 22 in a first axial direction (e.g., to the left in FIG. 1) to close the lockup clutch 18 and rotationally lock the turbine hub 20 with respect to cover 12, thereby bypassing the operation of the torque converter. In other words, when the fluid pressure in the apply chamber 28 exceeds the fluid pressure in the compensation chamber 26, the piston 22 travels in the first axial direction to close the lockup clutch 18. To disengage or open the lockup clutch 18 to allow operation of the torque converter, fluid pressure in the compensation chamber 26 is configured to displace the piston 22 in a second axial direction opposite the first axial direction (e.g., to the right in FIG. 1) to open the lockup clutch and allow independent rotation of the cover 12 and the turbine hub 20. In other words, when the fluid pressure in the compensation chamber 26 exceeds the fluid pressure in the apply chamber 28, the piston 22 travels in the second axial direction to open the lockup clutch 18.

According to embodiments of this disclosure, the hub 20 is provided with a plurality of fluid channels (e.g., first fluid channel 30 and second fluid channel 32) to allow the fluid to enter and exit the various fluid chambers, such as compensation chamber 26 and apply chamber 28. The first fluid channel 30 is configured to fluidly couple the compensation chamber 26 with a first flow channel 34 formed in the input shaft 24. The second fluid channel 32 is configured to fluidly couple the apply chamber 28 with a second flow channel 36 between an end of the input shaft 24 and the hub 20. The second flow channel 36 is fluidly coupled to a channel running through the center of the input shaft 24 and concentrically inside of flow channel 34. The two flow channels (34, 36) are divided by a thin section of material and is capped by an end 38 of the turbine hub 20, as will be further described below. In another embodiment the second flow channel 36 is formed within the input shaft 24. Although the first fluid channel 30 and second fluid channel 32 are shown in the same section view, it should be understood that the fluid channels 30, 32 are circumferentially offset as evidenced by thee dashed lines on fluid channel 30 where the channels 30, 32 appear to intersect. That is, the fluid channels 30, 32 are independent of one another so that there is no fluid exchange between the first fluid channel 30 and the second fluid channel 32.

The turbine hub 20 has an axial end 38 that is closed off in other words, the axial end 38 extends radially inwardly to end at the center axis and has no axially-extending apertures. This provides an axial boundary or closure on the turbine hub 20. This axial end 38 axially separates the compensation chamber 26 from the second flow channel 36 that feeds into the apply chamber 28. By closing off the end of the turbine hub at the axial end 38, the flow path of the fluid can be redirected out of the turbine hub 20 through one or more radially-extending holes 40 (which can be drilled or otherwise formed in the turbine hub 20) which feeds into the apply chamber 28. The turbine hub 20 is therefore designed to have two crossing (e.g., radially overlapping) flow paths formed therein; the flow path flowing through the hole 40 which feeds into the apply chamber 28 crosses over an outer flow path which passes through fluid channel 30 formed in the hub 20 which also feeds the compensation chamber 26. A single turbine hub 20 with two crossing flow paths (one that supplies fluid to the compensation chamber 26, and one that supplies fluid to the apply chamber 28) is therefore provided. And, as shown in FIG. 2 for example, the first fluid channel 30 can extend in a direction generally parallel to the central axis.

The radially-extending hole 40 can be located between a pair of dynamic seals 42, 44. A compensation plate 46 provides an axial boundary for the apply chamber 28. One of the dynamic seals 42 is provided between the turbine hub 20 and the piston 22 to allow relative axial movement therebetween, while the other dynamic seal 44 is provided between the turbine hub 20 and the compensation plate 46 to allow relative axial movement therebetween. By closing off the end 38 of the turbine hub 20, a flow path 50 that feeds the apply chamber 28 can be redirected out of the turbine hub 20 through the radially-extending hole 40 that is positioned between the two seals 42, 44. The other flow path 52 (one that feeds the compensation chamber 26) can then be rerouted through the axially-extending hole in the hub 20, outside of the enclosed end 38 of the turbine hub 20, to the engine side of both dynamic seals 42, 44.

The crossing of the flow paths 50, 52 within the turbine hub 20 allows each oil flow path 50, 52 to proceed radially outward to the desired pressure chamber (i.e., the apply chamber 28 and the compensation chamber 26, respectively), This can eliminate the need for a complex, machined cross-flow cover hub. Rather than machining a cover hub, a single turbine hub 20 can be made with two crossing flow holes that can be drilled therein, which can be much more economical with reduced labor and manufacturing complexities.

Figure 3:
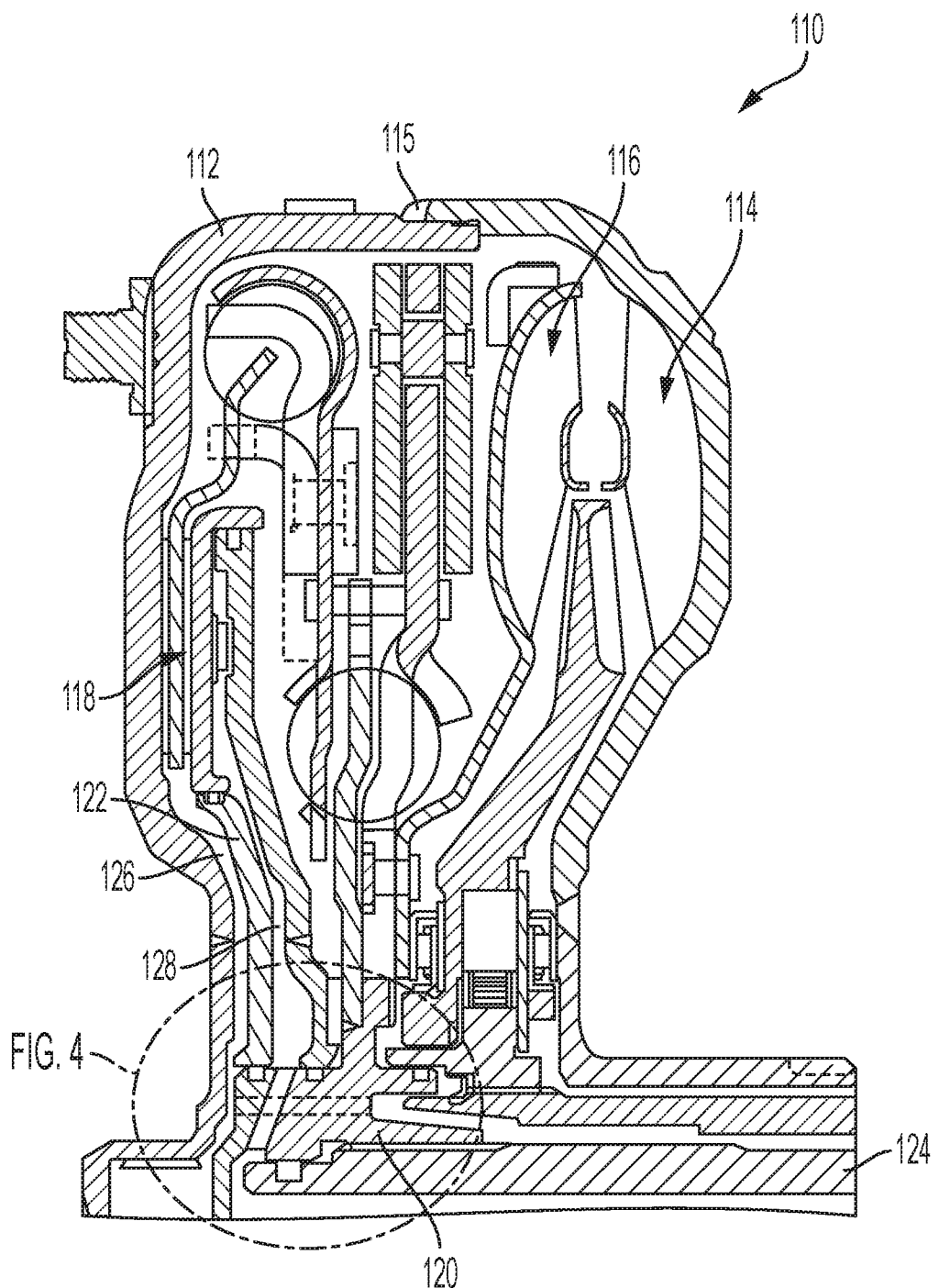
FIG. 3 is a cross-sectional view of a three-pass torque converter having crossing fluid channels in a turbine hub, according to one embodiment.
Figure 4:
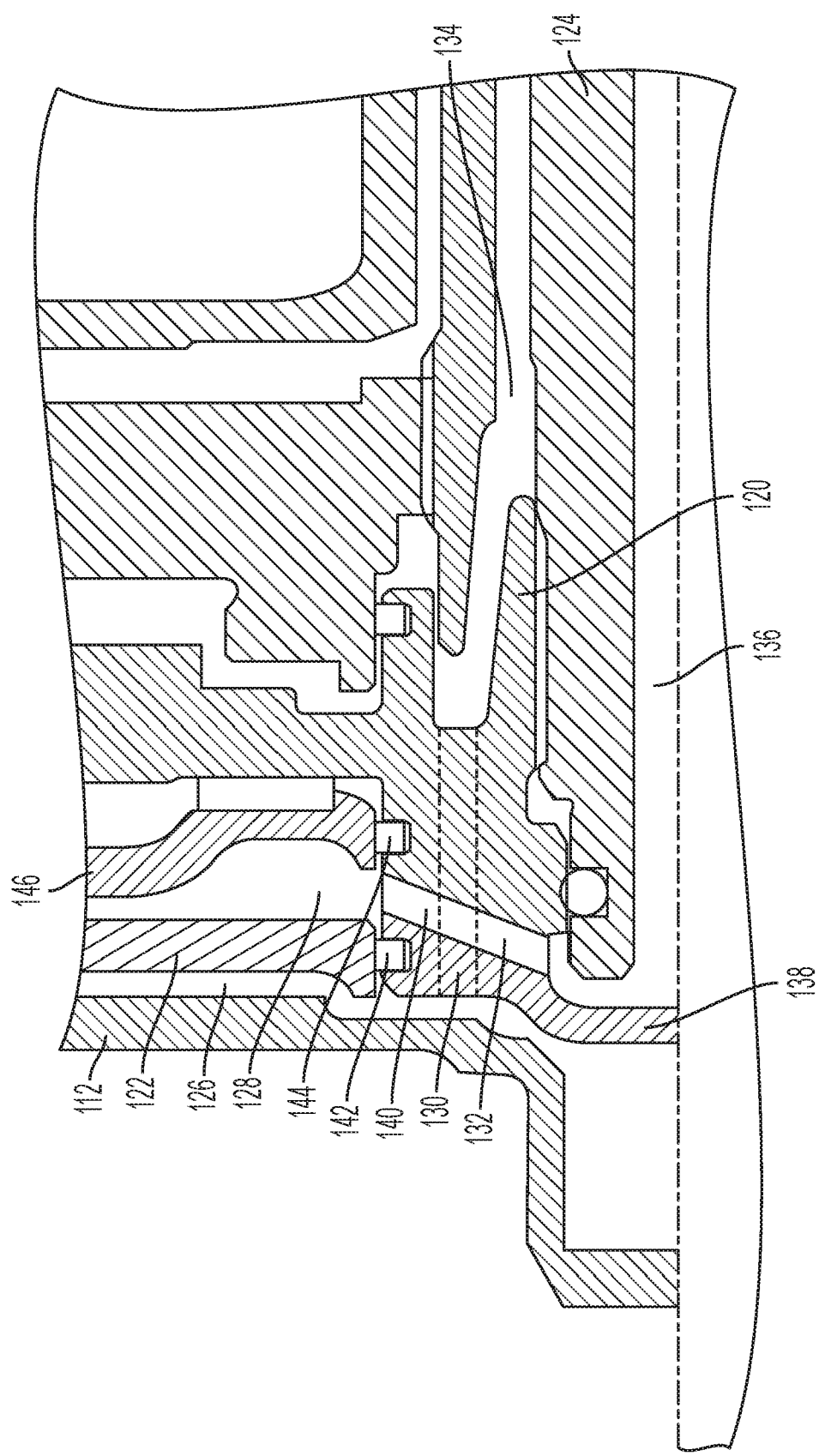
FIG. 4 is an enlarged view of a region of FIG. 3.

FIG. 3 illustrates a torque converter 110 according to another embodiment, and FIG. 4 illustrates an enlarged view of a region of FIG. 3. In FIGS. 3-4, similar parts are illustrated with similar reference numbers, increasing by 100. While the torque converter 10 of FIGS. 1-2 is a four-pass torque converter, the torque converter 110 of FIGS. 3-4 is a three-pass torque converter. This embodiment is provided to illustrate that the turbine hub with two cross-flow fluid paths can be implemented in both a three-pass torque converter as well as a four-pass torque converter.

Various parts of the torque converter 110 rotate about a central axis. The torque converter 110 includes a cover 112 configured to receive torque from a crankshaft of an internal combustion engine. The torque converter 110 may also include an impeller 114, also referred to as a pump. The cover 112 and an outer shell of the impeller 114 may be non-rotatably fastened together via a weld 115, for example. The torque converter may also include a turbine 116, a lockup clutch 118, and a turbine hub 120. The lockup clutch 118 includes an axially-displaceable piston plate 122 (also referred to as a piston) configured to directly connect the cover 112 to the turbine hub 20. The turbine hub 120 can be non-rotatably connected (e.g., via a spline connection) to an input shaft 124 for a transmission to transfer torque from the torque converter 110 to the transmission. As such, the turbine hub 120 can also be referred to as an output hub.

The torque converter 110 includes several chambers for receiving fluid, including a circulation chamber 126 (or first pressure chamber) and an apply chamber 128 (or second pressure chamber), each of which are partially bound by the piston 122. In operation, fluid pressure in the apply chamber 128 is configured to displace the piston 122 in a first axial direction (e.g., to the left in FIG. 3) to close the lockup clutch 118 and rotationally lock the turbine hub 120 with respect to cover 112, thereby bypassing the operation of the torque converter. In other words, when the fluid pressure in the apply chamber 128 exceeds the fluid pressure in the circulation chamber 126, the piston 122 travels in the first axial direction to close the lockup clutch 118. To disengage or open the lockup clutch 118 to allow operation of the torque converter, fluid pressure in the circulation chamber 126 is configured to displace the piston 122 in a second axial direction opposite the first axial direction (e.g., to the right in FIG. 3) to open the lockup clutch and allow independent rotation of the cover 112 and the turbine hub 120. In other words, when the fluid pressure in the circulation chamber 126 exceeds the fluid pressure in the apply chamber 128, the piston 122 travels in the second axial direction to open the lockup clutch 118.

According to embodiments of this disclosure, the hub 120 is provided with a plurality of fluid channels (e.g., first fluid channel 130 and second fluid channel 132) to allow the fluid to enter and exit the various fluid chambers, such as circulation chamber 126 and apply chamber 128. The first fluid channel 130 is configured to fluidly couple the circulation chamber 126 with a first flow channel 134 formed in the input shaft 124. The second fluid channel 132 is configured to fluidly couple the apply chamber 128 with a second flow channel 136 between an end of the input shaft 124 and the hub 120. In another embodiment the second flow channel 136 is formed within the input shaft 124. Once again, although the first fluid channel 130 and second fluid channel 132 are shown in the same section view, it should be understood that the fluid channels 130, 132 are circumferentially offset as evidenced by thee dashed lines on fluid channel 130 where the channels 130, 132 appear to intersect. That is, the fluid channels 130, 132 are independent of one another so that there is no fluid exchange between the first fluid channel 130 and the second fluid channel 132.

Similar to the first embodiment in FIGS. 1-2, the turbine hub 120 has an axial end 138 that is closed off. In other words, the axial end 138 extends radially inwardly to end at the center axis and may not have any axially-extending apertures therethrough. This provides an axial boundary or closure on the turbine hub 120. This axial end 138 axially separates the circulation chamber 126 from the second flow channel 136 that feeds into the apply chamber 128. By closing off the end of the turbine hub at the axial end 138, the flow path of the fluid can be redirected out of the turbine hub 120 through one or more radially-extending holes 140 (which can be drilled or otherwise formed in the turbine hub 20) which feeds into the apply chamber 28. The turbine hub 120 is therefore designed to have two crossing (e.g., radially overlapping) flow paths formed therein; the flow path flowing through the hole 140 which feeds into the apply chamber 128 crosses over an outer flow path which passes through fluid channel 130 formed in the hub 120 which also feeds the circulation chamber 126. A single turbine hub 120 with two crossing flow paths (one that supplies fluid to the compensation chamber 126, and one that supplies fluid to the apply chamber 128) is therefore provided.

The radially-extending hole 140 can be located between a pair of dynamic seals 142, 144. One of the dynamic seals 142 is provided between the turbine hub 120 and the piston 122 to allow relative axial movement therebetween, while the other dynamic seal 144 is provided between the turbine hub 120 and the circulation plate 146 to allow relative axial movement therebetween. By closing off the end 138 of the turbine hub 120, one flow path that feeds the apply chamber 128 can be redirected out of the turbine hub 120 through the radially-extending hole 140 that is positioned between the two seals 142, 144. Another flow path 152 (one that feeds the circulation chamber 126) can then be rerouted through the axially-extending hole 130 in the hub 120, outside of the enclosed end 138 of the turbine hub 120, to the engine side of both dynamic seals 142, 144

One again, the crossing of the flow paths within the turbine hub 120 allows each oil flow path to proceed radially outward to the desired pressure chamber (i.e., the apply chamber 128 and the circulation chamber 126, respectively). This can eliminate the need for a complex, machined cross-flow cover hub. Rather than machining a cover hub, a single turbine hub 120 can be made with two crossing flow holes that can be drilled therein, which can be much more economical with reduced labor and manufacturing complexities.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 torque converter
12 cover
14 impeller
15 weld
16 turbine
18 lockup clutch
20 turbine hub
22 piston plate
24 input shaft
26 compensation chamber
28 apply chamber
30 first fluid channel
32 second fluid channel
34 first flow channel
36 second flow channel
38 axial end
40 radially-extending holes
42 dynamic seal
44 dynamic seal
46 compensation plate
50 flow path
52 flow path
110 torque converter
112 cover
114 impeller
115 weld
116 turbine
118 lockup clutch
120 turbine hub
122 piston plate
124 input shaft
126 circulation chamber
128 apply chamber
130 first fluid channel
132 second fluid channel
134 first flow channel
136 second flow channel
138 axial end
140 radially-extending holes
142 dynamic seal
144 dynamic seal
146 circulation plate
152 flow path

What is claimed is:
1. A four-pass torque converter comprising:
a cover configured to rotate about a central axis;
a turbine hub configured to rotate about the central axis and be connected radially about a transmission input shaft;
a piston plate configured to slide axially relative to the turbine hub to selectively open and close a lockup clutch;
a compensation chamber at least partially bound by one side of the piston plate; and
an apply chamber at least partially bound by an opposite side of the piston plate relative to the compensation chamber, wherein an application of pressurized fluid in the apply chamber moves the piston plate in an axial direction to close the lockup clutch;
wherein the turbine hub includes:
a first fluid channel formed therein and configured to supply fluid to the compensation chamber, and
a second fluid channel formed therein and configured to supply fluid to the apply chamber.

2. The four-pass torque converter of claim 1, wherein the first fluid channel extends in a direction generally parallel to the central axis.

3. The four-pass torque converter of claim 1, wherein the first fluid channel and the second fluid channel radially overlap.

4. The four-pass torque converter of claim 1, wherein the second fluid channel is fluidly coupled to the apply chamber at a location axially between a first seal sealingly, connecting the piston plate with the turbine hub, and the second seal sealingly connecting the compensation plate with the turbine hub.

5. The four-pass torque converter of claim 4, wherein the first seal and the second seal are axially fixed relative to the turbine hub.

6. The four-pass torque converter of claim 1, wherein the turbine hub has an axial end that is closed having no apertures extending axially therethrough other than the first fluid channel to provide a closed axial boundary for the turbine hub.

7. The four-pass torque converter of claim 1, wherein the first fluid channel and the second fluid channel are configured to deliver fluid in opposing axial directions.

8. A torque converter comprising:
a cover;
a turbine;
a turbine hub connected radially about a transmission input shaft;
a piston plate configured to slide axially along to the turbine hub to selectively open and close a lockup clutch;
a first pressure chamber at least partially bound by a first side of the piston plate; and
a second pressure chamber at least partially hound by a second side of the piston plate;
wherein the turbine huh includes:
a first fluid channel extending axially therethrough configured to supply fluid to the first pressure chamber, and
a second fluid channel extending radially therethrough and configured to supply fluid to the second pressure chamber.

9. The torque converter of claim 8, wherein the turbine hub is closed at one axial end and includes no apertures extending therethrough at the one axial end other than the first fluid channel.

10. The torque converter of claim 8, wherein the first fluid channel and the second fluid channel radially overlap.

11. The torque converter of claim 8, wherein the second fluid channel is fluidly coupled to the first pressure chamber at a location axially between a first seal and a second seal.

\* \* \* \* \*